United States Patent [19]
Ohmi

[11] Patent Number: 5,643,692
[45] Date of Patent: Jul. 1, 1997

[54] POWER GENERATOR

[76] Inventor: Tadahiro Ohmi, 1-17-301, Ko-megabukuro 2-chome, Aoba-ku, Sendai-shi, Miyagi-ken, Japan, 980

[21] Appl. No.: 382,055
[22] PCT Filed: Aug. 10, 1993
[86] PCT No.: PCT/JP93/01131
§ 371 Date: Feb. 28, 1995
§ 102(e) Date: Feb. 28, 1995
[87] PCT Pub. No.: WO94/05055
PCT Pub. Date: Mar. 3, 1994

[30] Foreign Application Priority Data

Aug. 12, 1992 [JP] Japan ................ 4-251308

[51] Int. Cl.$^6$ ........................... H01M 12/08
[52] U.S. Cl. ............... 429/72; 429/101; 429/105; 429/120; 429/199
[58] Field of Search ................. 429/199, 101, 429/20, 72, 112, 188, 105, 12

[56] References Cited

U.S. PATENT DOCUMENTS

| | | |
|---|---|---|
| 4,728,587 | 3/1988 | Horie et al. ............... 429/101 |
| 4,731,309 | 3/1988 | Hoffman ................... 429/188 |
| 4,833,046 | 5/1989 | Roy ..................... 429/199 X |

FOREIGN PATENT DOCUMENTS 61-2278  1/1986  Japan .

Primary Examiner—Anthony Skapars
Attorney, Agent, or Firm—Baker & Daniels

[57] ABSTRACT

To provide a power generator capable of replacing thermal generators, which is capable of realizing large amounts of power at low cost while using almost no fossil fuels and without polluting the environment.

A solution comprising a solvent, which itself does not dissociate, having added thereto a substance which dissociates in the solvent, stored in the interior of a container having an inner surface possessing corrosion resistance and insulating properties, wherein an anode electrode having a small work function and a cathode electrode having a large work function are immersed in a mutually opposing manner in the solution.

A power generator comprising: a container having an inner surface possessing corrosion resistance and insulating properties, a solution comprising water added to anhydrous hydrogen fluoride, stored in the interior of the container so as to be isolated from the atmosphere, an anode electrode comprising a material having a small work function and possessing corrosion resistance, a cathode electrode comprising a material having a large work function and possessing corrosion resistance, and a heat application mechanism.

21 Claims, 8 Drawing Sheets

POWER GENERATOR

TECHNICAL FIELD

The present invention relates to a power generator, and in particular relates to a power generator which consumes almost no fossil fuels, does not pollute the environment, and which makes it possible to obtain large amounts of power at low cost.

BACKGROUND ART

Presently, power generators can be classified into thermal power generators, hydroelectric power generators, nuclear power generators, solar power generators, and the like.

However, thermal power generators, which are presently the main form of power generator, generate $CO_2$ gas, and are thus a substantial contributor to the present global warming; furthermore, they necessitate the widespread use of antipollution devices in order to prevent the atmospheric pollution which results from the combustion of large amounts of fossil fuels such as petroleum and coal.

Hydroelectric power generators do not present the problem of atmospheric pollution; however, not only are a great number of sites required for dam construction and the like, but also almost no appropriate sites having economically advantageous site conditions remain.

As can be seen from the case of the Chernobyl accident, should an accident occur in a nuclear power generator, the effects on the environment and human beings are extremely great. At the same time, uranium, which serves as the raw material for such power plants, is a type of fossil fuel, so that the amount of underground deposits thereof is limited.

Solar cell power generators make it possible to obtain clean power; however, the cost thereof is high, and the service life of the devices is short, and large-scale power generation is difficult.

It is an object of the present invention to provide a power generator which uses almost no fossil fuels, does not pollute the environment, and makes it possible to obtain large amounts of power at low cost.

DISCLOSURE OF THE INVENTION

In order to solve the above-stated problems, in the power generator of the present invention, a solution comprising a solvent, which itself does not dissociate, having added thereto a substance which dissociates in this solvent, is placed within a container having an inner surface possessing corrosion resistance and electrically insulating properties with respect to the solution, an anode electrode having a small work function, and a cathode electrode having a large work function, are immersed in the solution stored within the container, in a mutually opposing manner, and a heat application mechanism for applying predetermined heat to the solution, are provided.

Here, the requirements for the solvent are as follows.

(1) The temperature range within which the solvent is in a liquid form must be wide, and the solvent must be in a liquid form at temperatures close to room temperature.

(2) In the ultrahigh purity state in which the dissociating substance has not been added, the solvent should possess as large an electric resistivity as possible.

(3) The added substance should dissociate at as high a proportion as possible to produce negative and positive ions, and this ion concentration should be as high as possible, while the electric resistivity should be as small as possible.

(4) In order to efficiently conduct the circulation of the solvent, the viscosity thereof should be as low as possible.

(5) The solvent should not possess flammability, combustibility, or explosiveness.

Furthermore, the conditions required for the substance to be added are as follows.

(1) The substance should dissociate in the solvent in a nearly ideal manner at as high a concentration as possible.

(2) The ions which are generated should possess neither corrosiveness nor reactivity, and after the transfer of electrons between the anode electrode and cathode electrode has occurred, these ions should not precipitate and adhere to the electrode surfaces, but should enter a gaseous or liquid state.

Furthermore, in order to apply electrons as efficiently as possible to the positive ions generated in the solvent, it is required that the work function of the cathode electrode be as great as possible.

In order to capture electrons as efficiently as possible from the negative ions produced in the solvent, it is required that the work function of the anode electrode be as small as possible.

More concretely, the power generator of the present invention is provided with at least:

a container having an inner surface possessing corrosion resistance and electrically insulating properties with respect to hydrogen fluoride containing moisture, a solution comprising anhydrous hydrogen fluoride fluid to which water has been added, which solution is stored within the container so as to be isolated from the atmosphere, an anode electrode comprising a material comprising corrosion resistance with respect to hydrogen fluoride containing moisture and having a small work function, and a cathode electrode comprising a material possessing corrosion resistance with respect to hydrogen fluoride containing moisture and having a large work function, these electrodes immersed in the solution so as to be mutually opposing, and a heat application mechanism for applying predetermined heat to the solution.

FUNCTION

Hereinbelow, the functions of the present invention will be explained with reference to Examples of the present invention.

Figure 1:
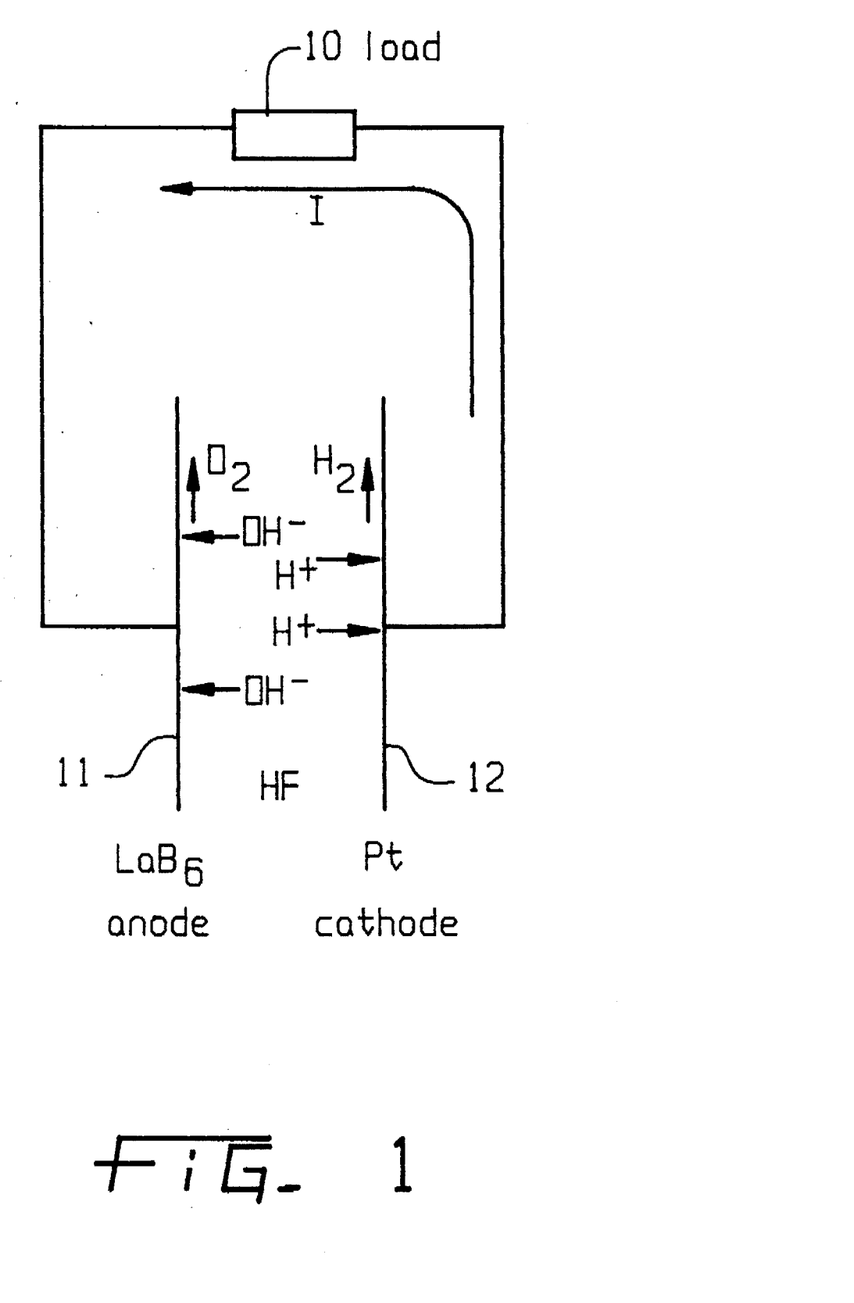
FIG. 1 shows a diagram explaining the present invention.

In FIG. 1, the basic configuration of the present invention is depicted.

In order to explain the functions of the present invention, a representative Example was used in which hydrogen fluoride fluid was used as the solvent, and water was used as the substance which was added thereto; however, the present invention is not limited thereto, and the scope of the present invention embraces other materials which are applicable to the basic principles of the present invention as described below.

As shown in FIG. 1, an anode electrode 11 comprising a material having a small work function, and a cathode electrode 12 comprising a material having a large work function, are disposed so as to be in mutual opposition and with a predetermined interval therebetween. Cathode electrode 12 and anode electrode 11 are connected through the medium of load 10, and when hydrogen fluoride containing moisture fills the interval between the electrodes, electrons flow through the medium of the load from the anode electrode, which has a small work function, through the space between the electrodes and to the cathode electrode, which has a large work function, so that a difference in electric potential is generated.

Furthermore, the water dissolved in the hydrogen fluoride dissociates, producing $H^+$ and $OH^-$.

The $H^+$ and the $OH^-$ move to the cathode and anode electrode sides, respectively, and based on the reactions $$4H^+ + 4e^- \rightarrow 2H_2 \quad (1)$$

$$4OH^- \rightarrow O_2 + 2H_2O + 4e^- \quad (2)$$

hydrogen gas and oxygen gas are produced, and a current flows through the load. That is to say, in the cathode electrode, an electron is applied to the $H^+$ ion and $H_2$ is generated, while at the anode electrode, an electron is captured from the $OH^-$ and $O_2$ is produced. The $H_2O$ produced at the anode again obtains thermal energy in the hydrogen fluoride solution, and dissociates into $H^+$ and $OH^-$ ions.

In general, water will itself dissociate into $H^+$ and $OH^-$ ions in the liquid form. However, the degree of this dissociation is small, so that, for example, in neutral water, the concentration of $H^+$ and $OH^-$ ions is extremely small, having a value of $10^{-7}$ mol/l. Accordingly, even when electrodes are immersed in such water, the current which is produced is extremely small, so that such a system is completely unsuitable for practical use. Furthermore, the case in which water is added to liquid hydrogen chloride is completely different from the case in which water is added to hydrogen fluoride. That is to say, even when water is added to liquid hydrogen chloride, this water exhibits almost no dissociation. As a result of these points, it can be seen that the use of hydrogen fluoride fluid as the solvent, and the use of water as the substance, is extremely desirable.

Moreover, when the present inventors investigated the relationship between the degree of ion dissolution of water and water concentration in a hydrogen fluoride fluid which is in a liquid form between the temperatures of $-83.5°$ C. and $+19.5°$ C. at normal pressures, they discovered that the case in which water is present in a hydrogen fluoride fluid differs from the case in which water is present in other solutions, and that the degree of dissociation of the water in this case was extremely high. This relationship is shown in FIG. 2, in the case in which the temperature of the hydrogen fluoride solution was maintained at $0°$ C.

Figure 2:
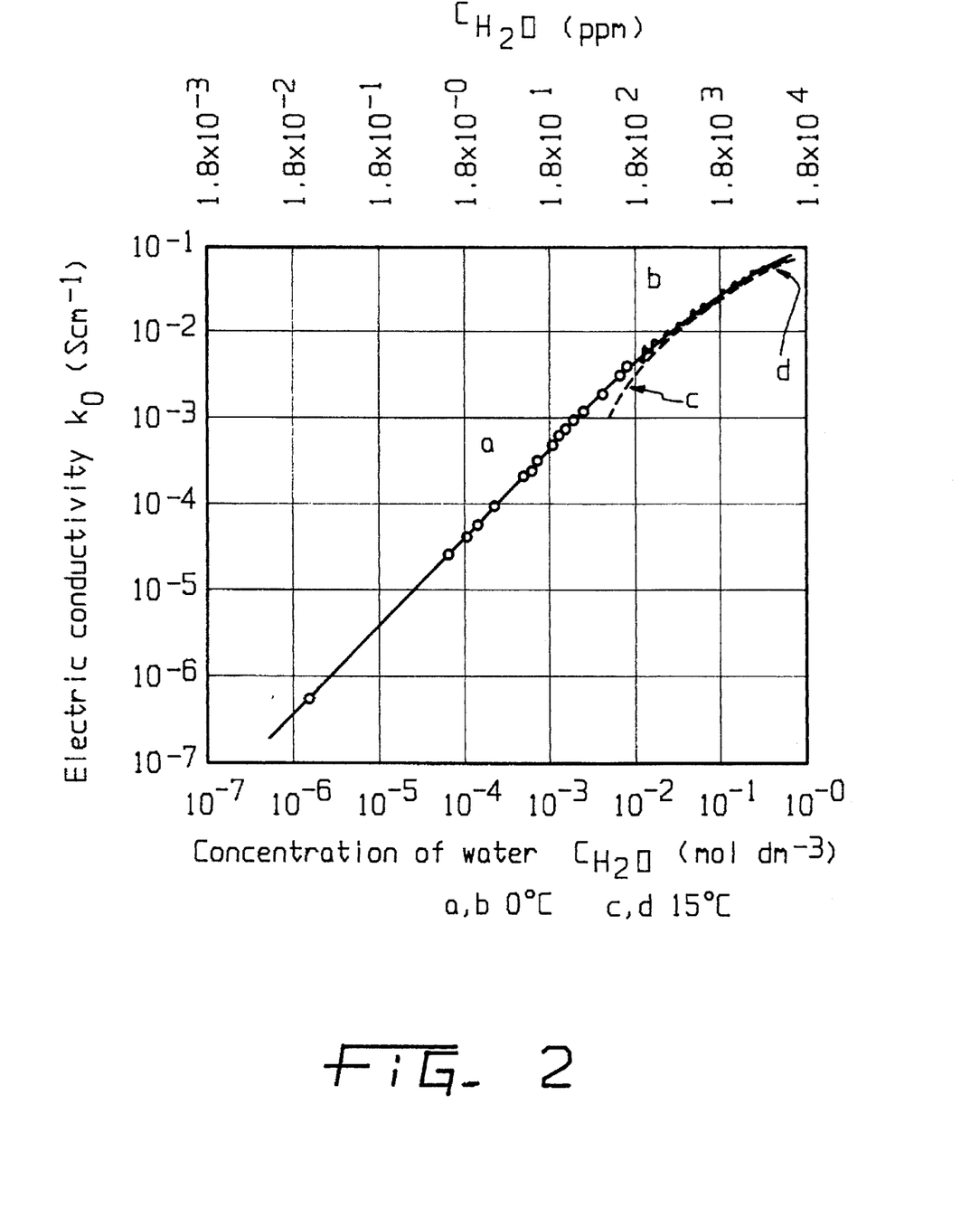
FIG. 2 shows a graph showing the relationship between the concentration of water in the hydrogen fluoride and the degree of dissociation.

As shown in FIG. 2, when the $H_2O$ concentration was 180 ppm, 1,800 ppm, and 18,000 ppm (1.8%), the conductivity of the hydrogen fluoride fluid was, respectively, $5 \times 10^{-3}$ sec·cm$^{-1}$, $3 \times 10^{-2}$ sec·cm$^{-1}$, and $1 \times 10^{-1}$ sec·cm$^{-1}$. In particular, it was discovered that in the case in which the $H_2O$ concentration was less than 300 ppm, 100% of the water disassociated to form H+ and $OH^-$ ions.

Here, we will consider hydrogen fluoride containing 300 ppm of water. If the water contained in this hydrogen fluoride is converted to a molar number, the following results:

$$1000 \ (cm^3) \times 1.002 \ (g/cm^3) \times 300 \times 10^{-6}/18 = 0.0167 \ (mol).$$

That is to say, $1.67 \times 10^{-2}$ (mol/l) results, and because 100% of this water dissociates, the following results:

$$H^+ = OH^- = 1.67 \times 10^{-2} \ (mol/l).$$

This is an extremely large value when compared with the $10^{-7}$ (mol/l) of the aqueous solution system, and represents a major characteristic of the power generator of the present invention. If the concentration of water is further increased, the concentration of the $H^+$ and $OH^-$ ions is further increased.

Figure 3:
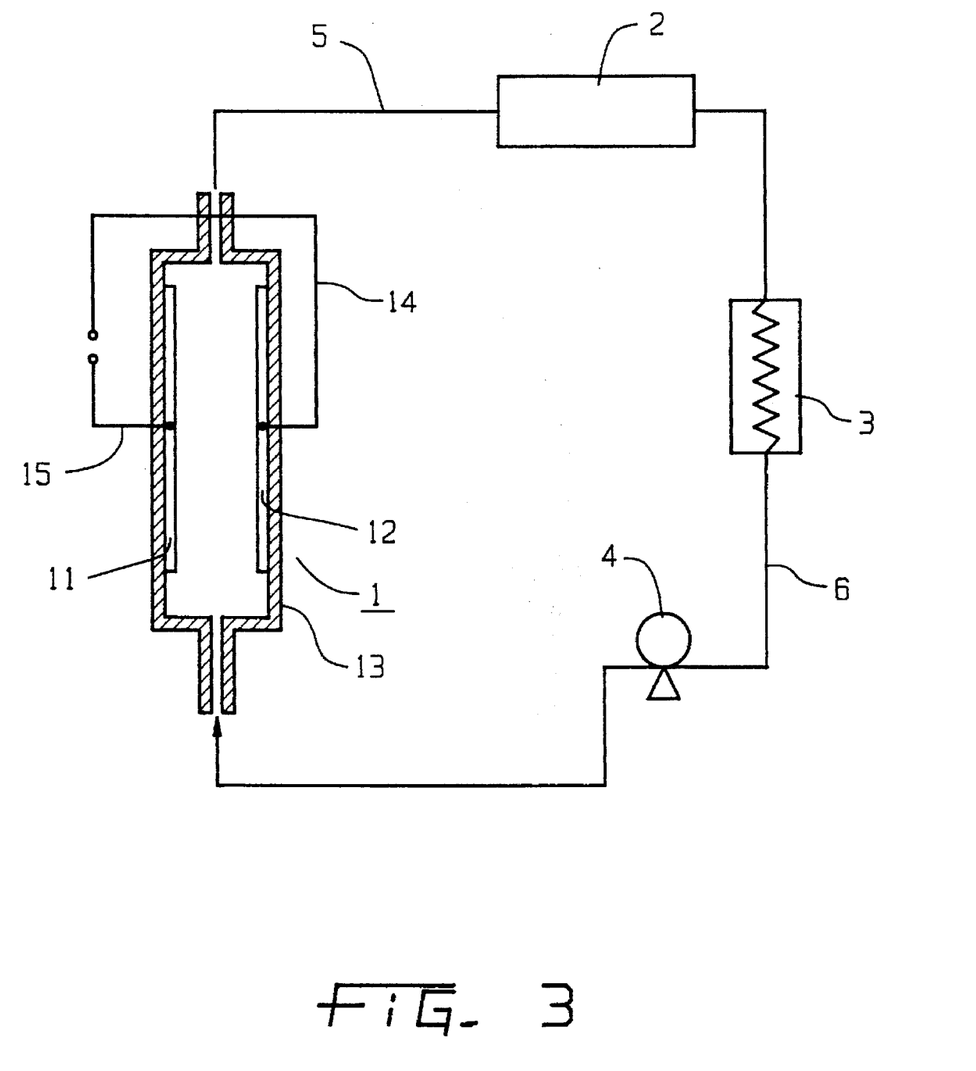
FIG. 3 shows a diagram of a power generator embodiment of the present invention.

Next, a system example of the power generator of the present invention is shown in FIG. 3.

In FIG. 3, reference numeral 1 indicates a generator unit; herein, an anode electrode 11 and a cathode electrode 12 are attached to a container 13, an inner surface of which has been subjected to insulating processing, and output lines 14 and 15 for outputting generated current are attached to each electrode.

Reference numeral 2 indicates a reaction vessel possessing a catalyst for producing water from the $H_2$ and $O_2$ gasses produced by generator unit 1. A granulated or powdered Pd or Pd alloy should preferably fill this reaction vessel. Furthermore, instead of granulating or powdering this catalyst, it is also acceptable to place a bundle of Pd or Pd alloy (for example, Pd-10 Ag-10 Au) tubes having a cross sectional honeycomb shape within this reaction vessel. In this case, in order to increase the surfaces in contact with $H_2$, it is preferable that the tubes be thin; for example, tubes having dimensions such that the inner diameter is within a range of 1.0–1.5 mm, the tube thickness is approximately 80 micrometers, and the length is approximately 70 cm, bundled into a honeycomb shape, are used.

Reference numeral 3 indicates a heat exchanger (provided with heating and cooling functions), reference numeral 4 indicates a circulation pump (pressure feeding mechanism) for circulating hydrogen fluoride solution containing moisture, and reference numeral 5 indicates a pipe, an inner surface of which has been subjected to insulating processing.

A hydrogen fluoride solution containing a predetermined water concentration is introduced in a pressurized state into the system of FIG. 3. At this time, the pressure is within a range of approximately $1^{-10}$ kg/cm². In order to maintain safety, it is preferable that the apparatus as a whole be provided with a construction which is resistant to pressure on a level of 70 kg/cm². The reason for this is that the critical temperature of the hydrogen fluoride solution is 18820 C., and the critical pressure is 66.16 kg/cm².

Figure 4:
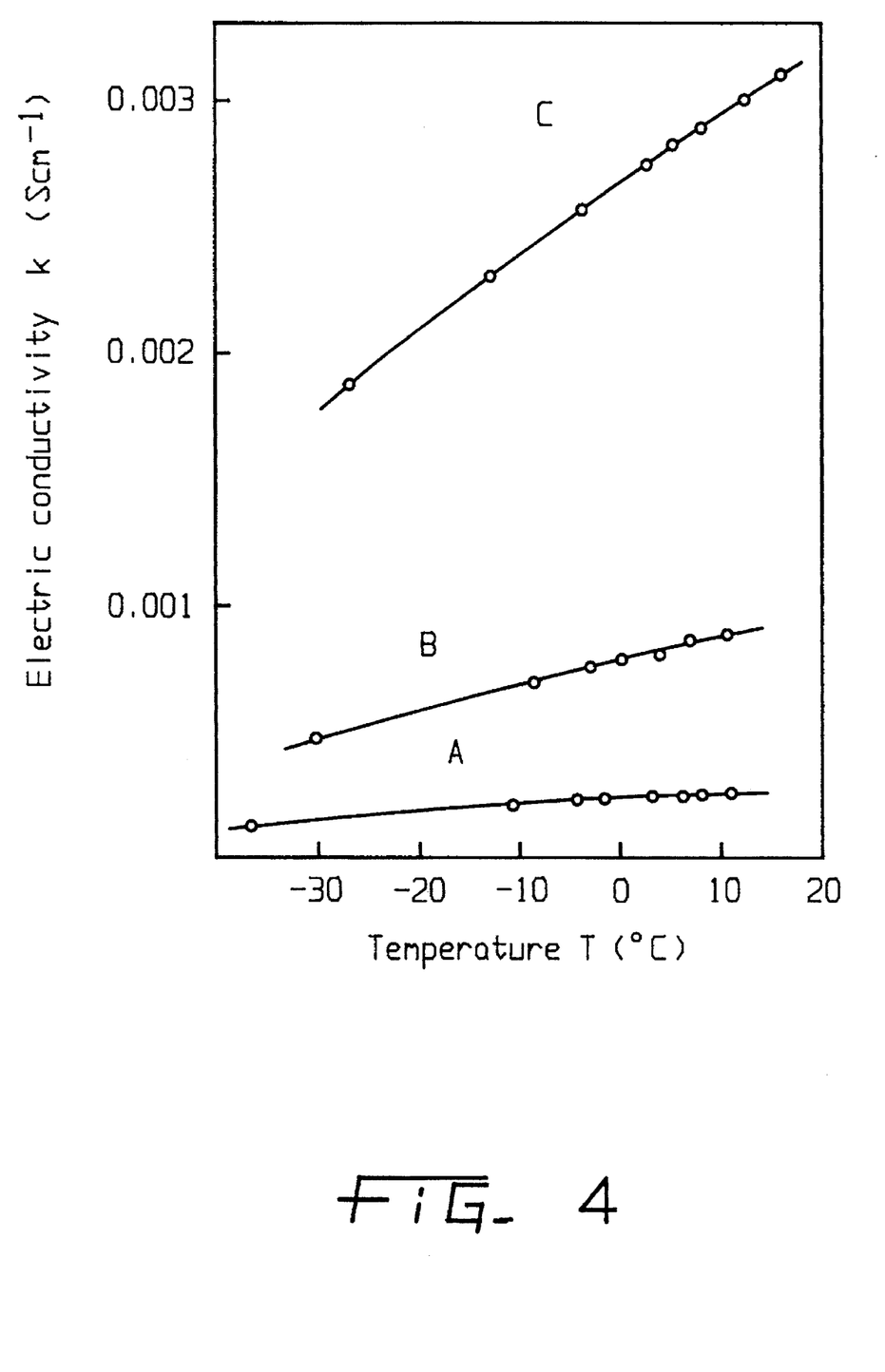
FIG. 4 shows a graph showing the relationship between the conductivity of the hydrogen fluoride containing water and temperature.

After this, the hydrogen fluoride is cooled by the heat exchanger 3 and is maintained at a predetermined temperature within a range of 40° C. to −30° C. The temperature changes in the conductivity of the hydrofluoric acid are shown in FIG. 4. Straight lines A, B, and C indicate temperature variations in the case in which the amount of water was, respectively, 10 ppm, 35 ppm, and 135 ppm. As can be understood from FIG. 4, as the temperature of the liquid decreases, the resistivity increases, so that it is preferable that the lower limit of the operational temperature be −30° C. When the load is connected between the output lines in this state, as explained above, the electrode reaction occurs, and a current flows through the load from the cathode electrode in the direction of the anode electrode. The voltage generated in the load can be increased by increasing the water concentration or by narrowing the space between the electrodes.

The $H_2$ and $O_2$ gasses produced in generator unit 1 are caused to flow along with the hydrogen fluoride solution into reaction vessel 2, where they come into contact with the catalyst within the reaction vessel, and as shown by the following formula, the $H_2$ molecules become hydrogen radicals (H*).

$$Pd+H_2 \rightarrow Pd+2H* \quad (3)$$

These hydrogen radicals react with the oxygen molecules to produce water.

$$\tfrac{1}{2} O_2+2H* \rightarrow H_2O \quad (4)$$

The H2O which is produced is immediately dissociated into ions in the hydrogen fluoride.

$$H_2O \rightarrow H^+ + OH^- - Q \quad (5)$$

(Q indicates heat of reaction)

As shown by the above formulas, the dissociation of water is an endothermic reaction, so that heat is captured from the hydrogen fluoride fluid, and as the cycle is repeated, the fluid temperature is reduced. When the fluid temperature is reduced, the conductivity of the hydrogen fluoride is also reduced, and the current obtainable in generator unit 1 becomes smaller. It is for this reason that heat is added by heat exchanger 3 (the heat application mechanism for applying heat to the hydrogen fluoride fluid), and the fluid temperature is maintained at a predetermined temperature.

In FIG. 3, a heat exchanger was used which had heating and cooling functions which was able to conduct both the heating and cooling of the fluid; however, it is not necessary to unify the heater and cooler, rather, they may be separately provided. If, for example, the hydrogen fluoride fluid is placed under pressure, the boiling point thereof will rise, and it is not absolutely necessary to provide a cooling function.

The vapor pressure of the hydrogen fluoride solution at various temperatures is shown in Table 1. If pressure is applied above 2.8 kg/cm², and 10.8 kg/cm², respectively, the hydrogen fluoride will remain in a liquid state even when a liquid temperature of 50° C. or 100° C. is reached.

TABLE 1

| Temperature (°C.) | Vapor Pressure (Kg/cm²) |
|---|---|
| −70 | 0.014 |
| −60 | 0.026 |
| −50 | 0.047 |
| −40 | 0.080 |
| −30 | 0.132 |
| −20 | 0.211 |
| −10 | 0.327 |
| 0 | 0.492 |
| 10 | 0.724 |
| 20 | 1.055 |
| 30 | 1.491 |
| 40 | 2.074 |
| 50 | 2.798 |
| 60 | 3.783 |
| 70 | 4.992 |
| 80 | 6.539 |
| 90 | 8.367 |
| 100 | 10.757 |

The cooling apparatus is only necessary during the initial period of operation of the system, so that it is not particularly necessary to install a dedicated apparatus. Furthermore, thermal energy sources for the heat which is applied by means of the heat application mechanism include, for example, solar energy, geothermal energy, and waste heat energy from incinerators; in addition, as the operating temperature is low, it is also possible to use thermal energy from sea water or the like.

If, for example, $LaB_6$ is used in the anode electrode, and Pt is used in the cathode electrode in the system shown in FIG. 3, the work functions of Pt and $LaB_6$ are, respectively, 5.64–5.93 eV and 2.66–2.76 eV, so that the difference in work function is approximately 2.98–3.27 eV, and the electromotive force between the cathode electrode and the anode electrode is on the level of 0.8–1.0 V.

Accordingly, even when the resistance loss of the hydrogen fluoride and the electrode potential is taken into account, it is possible to obtain a voltage of 0.8–1.0 V or more.

Furthermore, if the flow rate of hydrogen fluoride containing approximately 1% of water is set at 1 cm3 per second, the generator unit is set so as to achieve a 100% electrode reaction of the $H^+$ and $OH^-$ ions, and an amount of ions contained in 1 cm³ of the hydrogen fluoride solution equalling $$H^+ = OH^- = 9 \times 10^{18} \text{ ions/cm}^3$$

is caused to flow to the electrodes, and the amount of charge will equal $$(9 \times 10^{18} \text{ electrons/cm}^3) \times 1.6 \times 10^{-19} \text{ coulombs/electron} = 1.44 \text{ coulombs,}$$

and a charge equalling this amount flows through the load each second, so that a current of 1.44 A is obtained.

At this time, the voltage is 0.8 V so that an electric power equalling $$0.8 \text{ V} \times 1.44 \text{ A} = 1.15 \text{ W}$$

is obtained.

This value is obtained in the case in which the flow rate of hydrogen fluoride containing approximately 1% water is set to 1 cm³/sec; if the system is so constructed that the flow rate of the hydrogen fluoride is 1 m³/sec, or 1000 m³/sec, then a large capacity power generator having a capacity of 1,152 kW or 1,150,000 kW, respectively, will be obtained. If the amount of water contained in the hydrogen fluoride is increased, the generated power will also increase.

The interval W and the surface area S of the anode electrode and cathode electrode will now be discussed.

The resistivity $\rho_1$ of hydrogen fluoride solutions containing 300 ppm, and 1.8%, water at a temperature of 0° C. is, respectively, 125 $\Omega$·cm, and 10 $\Omega$·cm. The resistivity $\rho_0$ of a hydrogen fluoride solution containing almost no water has not yet been determined; however, it can be inferred from FIG. 2 that $\rho_0$ would have a value of more than $10^7$ $\Omega$·cm. However, if the ionizing reaction at the anode electrode and cathode electrode is to be conducted at an efficiency of approximately 100%, then it is preferable that the current density $J(A/cm^2)$ be set to a value within a range of 10 mA/cm² to 100 A/cm². If the resistivity of a hydrogen fluoride solution containing no water is designated $\rho_1$ ($\Omega$·cm), then the voltage decrease $\Delta V$ between the anode electrode and the cathode electrode is given by $$\Delta V = \rho_1 \, WJ \; (V)$$

If $\rho_1$ is set equal to 125 $\Omega$·cm, and J is set within a range of 10 mA/cm² to 1000 mA/cm², then $$\Delta V = 1.25 \; W \; (V) - 12.5 \; W \qquad (V).$$

If W is set equal to $1 \times 10^{-2}$ cm=100 μm, then $$\Delta V = 0.0125 \; V - 0.125 \; V,$$

and in comparison with the electromotive force of 0.8 V, this can be ignored.

If W is set equal to 1 mm, then $$\Delta V = 0.125 \; V - 1.25 \; V,$$

and as the current density J increases, the voltage decrease between the anode electrode and the cathode electrode becomes too large, and it becomes impossible to generate a large electromotive force to the exterior. In order to reduce the current density, it is necessary to narrow the interval W between the anode electrode and the cathode electrode, and to increase the amount of water present in the hydrogen fluoride solution by 1,000 ppm to 20,000 ppm. The efficiency of the ionization reaction at the electrode surfaces and the current density can be controlled by adjusting interval W and the flow speed of the fluid. When the amount of water present in the hydrogen fluoride solution becomes small, the resistivity $\rho_1$ of the fluid increases, and the flowing current density becomes small, so that it is necessary to increase the size of the surfaces of the anode electrode and the cathode electrode, and this is not efficient.

Figure 5:
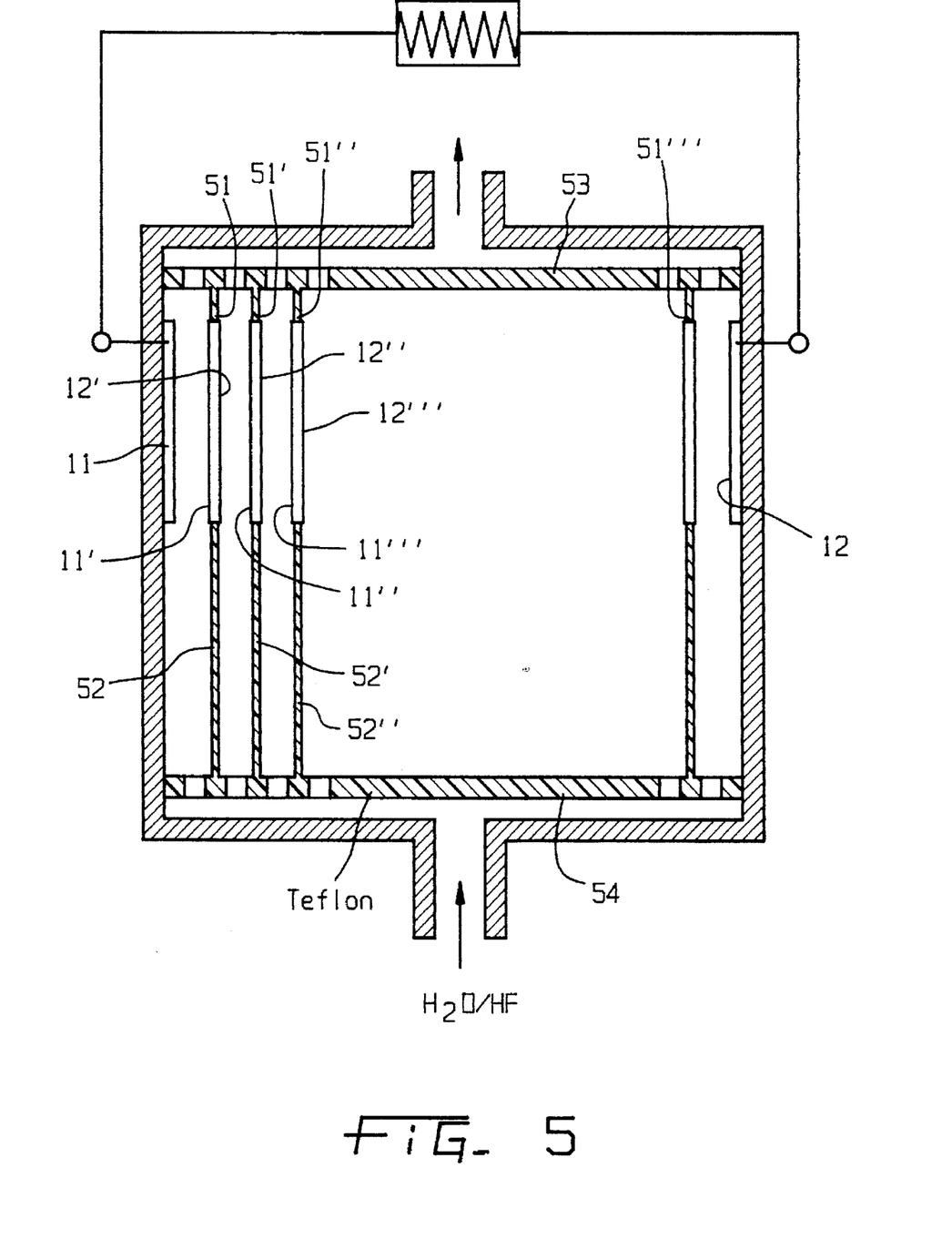
FIG. 5 shows a diagram of a power generator embodiment of the present invention.

In the Example shown in FIG. 3, in which a cathode electrode and an anode electrode pair are provided, the output voltage of the generating system is approximately 0.8 to 1.0 V, and in such a state, the proportion of the loss in the following power conversion system becomes large, so that the efficiency thereof is poor. Accordingly, it is preferable to provide the electrodes of the generator unit in a number of stages, as shown in FIG. 5, and thus to set the output voltage of the generator unit to a level of from tens of volts to tens of thousands of volts. It should be obvious that it is also possible to design the system so as to produce hundreds of thousands or millions of volts; this should be determined in accordance with the compatibility with the power conversion system.

The interior of the container is divided into sections by partitions (for example, fluorine resins such as Teflon or PFA) 51, 51', 51", ..., 52, 52', 52", ..., 53, 54, and by electrodes; each of the spaces herein comprises 1 unit cell. In the diagram, the electrode 11 on the left end indicates an electrode having a small work function (for example, LaB$_6$, TiN), while the electrode 12 on the right end indicates an electrode having a large work function (for example, Pt, Pd, Au, Ni), and the electrodes provided therebetween are electrodes in which LaB6 (11', 11", 11''', ...) and Pt (12', 12", 12''', ...) are affixed to one another. Furthermore, it is also possible to use electrodes in which Pt and LaB$_6$ are coated onto, or are affixed to, the front and rear surfaces of a metal such as stainless steel. By giving each cell an identical structure and causing an identical amount of hydrogen fluoride solution to flow thereinto, the power generated between the cathode electrode which is at the right end in the diagram, and the anode electrode which is at the left end in the diagram, has a value equal to the value of one cell multiplied by the number of stages. The current which flows is identical to that in the case of a single cell.

The length of partitions 52, 52', ..., in the direction of flow of the hydrogen fluoride solution is set in accordance with the size of the electrodes, the distance between electrodes, the resistivity of the hydrogen fluoride, the flow speed, the number of stages, and the like; however, in order to prevent the leakage of current between cells, it is preferable that this length be somewhat greater than the electrode length. Furthermore, in order that the H$^+$ and the OH$^-$ ions be converted into H$_2$O and O$_2$ by the electrode reaction in the hydrogen fluoride, the length of partitions 51, 51', ..., is set so as to be shorter than the length of partitions 52, 52', ...

Figure 6A:
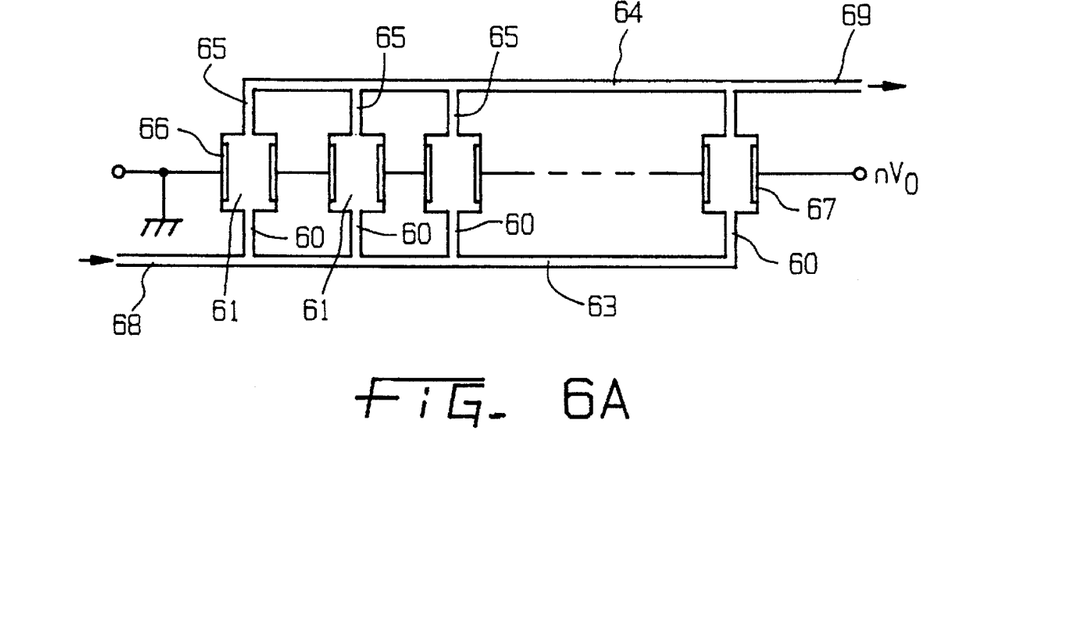
FIG. 6 shows a diagram of another power generator embodiment of the present invention.
Figure 6B:
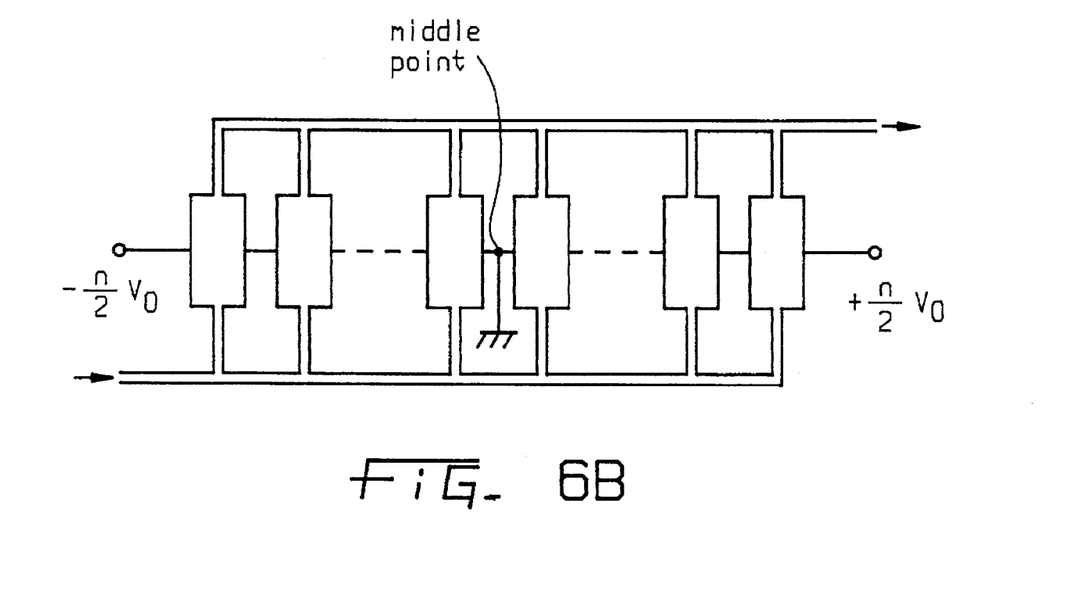

In addition to the multistaged method shown in FIG. 5, other such methods include one in which a plurality of the unit cells are connected, in a manner identical to that shown in FIG. 5, to produce a unit 6, and as shown in FIGS. 6(a) and (b), the input ports 60 of units 61 are connected by means of a main input pipe 63, while the output ports 65 are connected by means of a main output pipe 64. Main input pipe 63 and main output pipe 64 form a closed system through the medium of a reaction vessel (not shown in the figure) and a pressure feeding mechanism (not shown in the figure). By constituting the apparatus in this manner, it is possible to obtain a higher output voltage. When a positive voltage is to be obtained with respect to the earth, the right end anode electrode, as shown in FIG. 6(a), may be grounded, while when a negative voltage is to be obtained, the right end cathode electrode 66 may be grounded. When positive and negative voltages having equal and absolute values are necessary as output voltages, the midpoint may be grounded, as shown in FIG. 6(b). By proceeding in this manner, DC/AC conversion can be accomplished extremely easily.

In FIG. 6, n indicates the number of stages, while V0 indicates the voltage generated by a unit.

In the case in which the inlet port 68 into main input pipe 63 is provided, for example, at the left side, as shown in FIG. 6(a), it is preferable, in order that solution be uniformly supplied to each unit 61, that the exhaust port 69 of the main output pipe 64 be provided at the right side, as shown in FIG. 6(a).

Furthermore, by attaching each unit 61 so that the main input pipe 63 and main output pipe 64 thereof are freely detachable, in the case in which a breakdown occurs in one of the units, it is possible to move and repair only the damaged unit without requiring a stoppage in the operations of the entire system. It is desirable to provide a circuit (not depicted in the figure) which is capable of automatically connecting the electrodes of the 2 units neighboring the unit to be repaired at this time. If branch valves (3-way valves) are provided at input port 60 and output port 65 of each unit 61, then the extraction and replacement of the solution within each unit 61 can be conducted easily. Furthermore, it is also possible to provide a flow meter or the like at input port 60 and output port 65.

Figure 7:
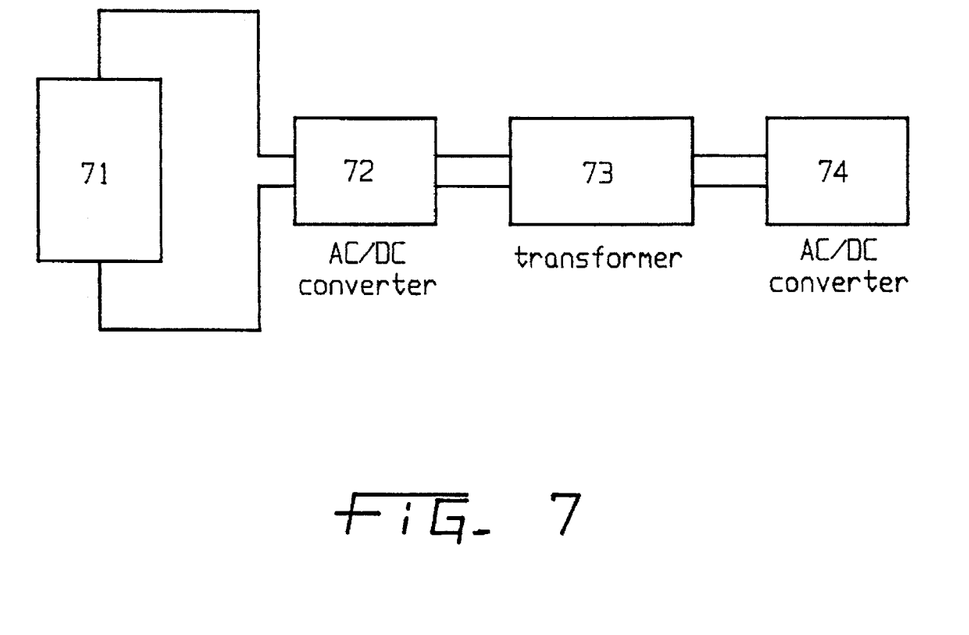
FIG. 7 shows a diagram of power source useful in conjunction with the power generator of the present invention.

The system depicted in FIG. 5 may be used as a power source for a number of uses, as shown, for example, in FIG. 7.

In FIG. 7, reference numeral 71 indicates the system shown in FIG. 5; outlet terminals thereof are connected to a DC/AC converter 72 which converts the direct current power of the power generation system into alternating current having a desired frequency. The output of the DC/AC converter 72 is raised to a desired voltage by transformer 73, reconversion to DC is then carried out in AC/DC converter 74, and this is supplied to electronic devices, machines, and the like. It is preferable that the frequency of the alternating current be within a range of 1 KHz–10 MHz, from the point of view of energy conversion efficiency.

With respect to the same amount of power, the size of the transformer becomes smaller in proportion to the inverse of the square root of the frequency as the frequency of the alternating current power increases, so that the transformer is reduced in size and weight. In the case in which the power which is thus handled is generated by means of single-cell power generation having a comparatively small amount of generated power, a semiconductor power conversion circuit which is used as a DC/AC converter and a AC/DC converter has superior frequency characteristics, and it is preferable that the frequency be set within a range of 100 KHz–10 MHz.

In the case in which this power generator is used in a conventional power plant, in order that the generator may be used with a preexisting transmission network or the like, it is preferable that the generated power be set to a level of 50 Hz/60 Hz by the DC/AC converter. In the case in which a DC transmission network has come into wide use, conversion can be conducted to a frequency which is appropriate in order to raise the voltage to a predetermined transmission voltage, and this voltage increase may be conducted by a transformer. This may be converted back to direct current by means of an AC/DC converter, and placed on a transmission network.

Embodiment Examples
Solvent, added substance:

The solvent which is used in the present invention must be a solvent which does not itself dissociate, and the substance which is added to this solvent is a substance which dissociates in the solvent.

An example of such a combination is, for example, one in which hydrogen fluoride is used as the solvent, and water is used as the added substance.

The concentration of the added substance varies based on the concrete combination of the solvent and the added substance; however, for example, in the case of the combination of hydrogen fluoride and water, the amount of water added should preferably be less than 2%. If a level of 2% is exceeded, the fluid which is obtained will no longer be one in which water is added to an anhydrous hydrogen fluoride solution. However, a level of 10 ppm or more is necessary in order that the resistivity not become too large, as shown in FIG. 2.

The anhydrous hydrogen fluoride itself does not possess strong corrosive properties; however, when water is added thereto, the corrosivity increases, and when the amount of water added exceeds a level of 2%, the anode electrode and the cathode electrode are corroded, as explained hereinbelow. Accordingly, it is preferable that the amount of water added be less than 1%. However, in the case in which less than 10 ppm of water is added, 100% of the water dissociates, but the ion concentration is reduced, and the electric resistivity of the hydrogen fluoride solution becomes undesirably high, reaching a level of tens of $\Omega \cdot cm$ or more, so that an efficient power generation system cannot be obtained.

In the present invention, the use of a solvent which does not itself dissociate is based on the following reasons. That is to say, in order to obtain a large amount of generated power, as shown in FIG. 5, it is preferable that electrodes be disposed in stages in the power generator. Moreover, if the solvent dissociates, the ions produced by this dissociation themselves will bear the load, and will cause current to flow undesirably between themselves and other electrodes. This causes a loss of power. Furthermore, the solvent itself is subject to ionization, and is converted to a gas by means of an ionization reaction at the electrodes, so that stable power generation cannot be maintained.

Water having the characteristics listed below is used as the water which is to be added.

| Resistivity (M$\Omega \cdot$ cm 25° C.) | >18 |
| Particles (ps/cc) >0.1 μm | <20 |
| TOC (μgC/l) | <50 |
| Dissolved oxygen (μgO/l) | <100 |

Electrode:

It is preferable that the work function anode electrode and the cathode electrode used in the present invention differ as much as possible. This is so that the electromotive force generated to the exterior can be as large as possible. However, as explained above, hydrogen fluoride containing a moisture component has high corrosivity, so that the electrodes must possess high corrosion resistance. Appropriate materials for the cathode electrode include, for example, Pt, Au, Ni, Pd, and the like. In particular, in the case in which Pd is used as the material for the cathode electrode, when $H_2$ is generated at the electrodes, this forms H*, so that an effective reconversion to water within the vessel can be expected, and a further decrease in size of the apparatus becomes possible. As a result of this, Pd is preferably used.

Furthermore, materials suitable for use in the anode electrode include, for example, $LaB_6$, TiN, NbC, $W_2C$, ZrN, ZrC, Cs, and the like. It is of course only necessary that the portions in contact with the hydrogen fluoride solution containing a moisture component comprise such materials, and accordingly, electrodes in which appropriate material is used as a base material, and the surface thereof is covered by one of the materials described above, is acceptable.

Moreover, in general, an oxide film or the like, although extremely thin, forms on the surfaces of such materials, and thus, impurities are deposited. The presence of such an oxide film or impurities impede the reaction on the electrode surface. However, the present invention has the advantage of using hydrogen fluoride containing a moisture component as the solution, so that it is possible to remove such oxide films or impurities by simply immersing the electrode into the solution, and accordingly, it is possible to expose the active surface of an electrode. This is one reason for the preferential use of a hydrogen fluoride solution containing a moisture component in the present invention.

Furthermore, it is preferable that the distance between the mutually opposing electrodes be as small as possible. If this distance is large, the voltage which is obtainable is reduced, as a result of the electric resistivity of the hydrogen fluoride solution containing a moisture component between the electrodes. Specifically, a distance of less than 1 cm is preferable, and a distance of less than 1 mm is further preferable. The lower limit thereof should be determined in consideration of the pressure loss, in the case in which the solution is circulated, or the degree of manufacturing difficulty; however, preferably, this lower limit should be within a range of 0.1 mm~0.3 mm.

For reference, the work function values of each electrode are listed below.

| Cathode Electrode | |
|---|---|
| Au | 5.1 ~ 5.47 eV |
| Ni | 5.04 ~ 5.35 eV |
| Pt | 5.64 ~ 5.93 eV |
| Pd | 5.55 eV |
| Anode Electrode | |
| LaB6 | 2.66 ~ 2.76 eV |
| TiN | 2.92 eV |
| NbC | 2.24 ~ 4.1 eV |
| W2C | 2.6 ~ 4.58 eV |
| ZrN | 2.92 eV |
| ZrC | 2.18 ~ 4.22 eV |
| Cs | 1.95 eV |

The disparities in the work function values result from crystalline structure and manufacturing methods.

Container:

In the present invention, a container having an interior (that is to say, the portion in which the hydrogen fluoride solution is stored) isolated from the atmosphere is used as the container for storing the hydrogen fluoride solution containing a moisture component. If the hydrogen fluoride solution comes into contact with the atmosphere, it absorbs moisture from the is atmosphere. Accordingly, the solution isolated from the atmosphere in order to prevent this. It is desirable that a material possessing corrosion resistance with respect to hydrogen fluoride containing a moisture component be used as the material of the container. For example, a fluorine system resin (more concretely, Teflon: a registered trademark of the DuPont Corporation, or PFA, or the like) may be used. It is of course possible to construct, of Teflon, only those portions which will come into contact with the hydrogen fluoride solution containing a moisture component, so that accordingly, for example, Teflon or PFA may be used as a lining on a stainless steel inner surface. In addition, a structure is possible in which, for example, a metal having formed thereon a passivated fluoride film having an approximately stoichiometric ratio is formed. Furthermore, it is most preferable to use a structure in which a metal material having formed on the surface thereof a passivated fluoride film having an approximately stoichiometric ratio is lined with a fluorine system resin. It is preferable that pure steel, stainless steel (in particular, SUS316L), or an aluminum alloy or a magnesium alloy be used as the metal material serving as the base material on which the passivated fluoride film is formed. The passivated fluoride film ($FeF_2$, $AlF_3$, $MgF_2$) formed on on this metal material is extremely fine, exhibits an extremely high corrosion resistance, even with respect to hydrogen fluoride containing a moisture component, and has superior electrically insulating characteristics. The film formation technology disclosed in, for example, Japanese Patent Application, First Publication, Laid-Open No. 2-270964 may be used for the formation of such a passivated fluoride film.

The boiling point of hydrogen fluoride is 19.6° C., so that there is the possibility of the conversion thereof to a gas at is normal temperatures. In order to prevent vaporization, it desirable that pressurization be conducted. For example, if pressurization is conducted to a pressure of approximately 11 kg/cm$^2$, vaporization can be prevented even if the temperature reaches 100° C. This point has been previously discussed in the "Function" section.

In order to provide pressure resistance, the use of a material in which, as described above, metal is used as a substrate, and Teflon, PFA or the like is applied to the inner surface thereof, or the use of a material in which a metal having formed on the surface thereof a passivated fluoride film, having an approximately stoichiometric ratio, is coated or lined with Teflon, PFA, or the like, is preferable. Furthermore, this will result in a reduction in costs.

Circulation System . . . Closed System:

In the present invention, hydrogen and oxygen are produced by the reaction at the electrodes. This hydrogen and oxygen may be permitted to exit the system for use, for example, as material for fuel cells. In such a case, replenishment of the consumed water is conducted.

However, in the case in which these gasses are extracted in this manner, the replenishment of the water thus consumed must be conducted, and this creates inconveniences in the operation of the apparatus. Furthermore, during replenishment, the hydrogen fluoride must be exposed to the atmosphere.

In the present invention, it is preferable that a closed system be employed in which the hydrogen and oxygen are returned to the system. That is to say, input and output ports are provided on the container, and these input and output ports are connected by piping through the medium of a pressure feeding mechanism for pressure feeding of solution within the container. Along this piping, a reaction vessel containing a catalyst such as Pd or the like is provided for reacting the hydrogen and oxygen.

In this type of structure, the $H_2O$ and $O_2$ gasses come into contact with the catalyst within the reaction vessel, and the H2 molecules become radicals (H*), as shown in the following formula.

$$Pd+H_2 \rightarrow Pd+2H* \qquad (6)$$

These hydrogen radicals react with the oxygen molecules to form water.

$$\tfrac{1}{2} O_2+2H* \rightarrow H_2O \qquad (7)$$

The H2O thus formed dissociates immediately to form ions as it is introduced into the hydrogen fluoride.

$$H_2O \rightarrow H^+ + OH^- - Q \qquad (8)$$

(Q Indicates the heat of reaction)

In the case of such a structure, there is some danger of pressure loss during the circulation of the hydrogen fluoride solution; however, the viscosity of the hydrogen fluoride is extremely small in comparison with that of other solutions (the characteristic values of hydrogen fluoride and water are shown in Table 2) and accordingly, the power necessary for the pressure feeding of the solution is extremely small in comparison with the power which is obtained. Thus, in the case of such a circulation system, the use of hydrogen fluoride as the solvent is extremely advantageous, and such a circulation system is designed so as to skillfully make use of the characteristics of hydrogen fluoride. Furthermore, only heat must be externally replenished, and maintenance is extremely simple.

TABLE 2:

| Characteristics | HF | $H_2O$ |
| --- | --- | --- |
| Boiling Point °C. | 19.54 | 100.0 |
| Melting Point °C. | −83.55 | 0.0 |
| Density g/cm$^3$ | 1.002 | 0.9999 |
| Viscosity (0° C.), cP | 0.256 | 1.7921 |
| Surface Tension (0° C.), dyn/cm | 10.1 | 74.28 |
| Dielectric Constant (0° C.) | 83.6 | 81.0 |
| Dipole Moment (0° C.), C · m | $6.10 \times 10^{-30}$ | $6.24 \times 10^{-30}$ |
| Specific Heat cal/g · deg | 0.61 | 1.0 |

Best Mode for Carrying Out the Present invention
Embodiment 1:

A first embodiment of the present invention using a system having the structure depicted in FIG. 3 will be explained.

In FIG. 3, reference numeral 1 indicates a generator unit, in which an anode electrode 11 comprising $LaB_6$ and a cathode electrode 12 comprising Pt are attached to a stainless steel container 13, a surface of which is lined with Teflon (registered trademark of the DuPont Corporation). The electrodes have dimensions such that the lengths thereof are 15 cm and widths thereof are 10 cm, and the distance between the electrodes is 100 micrometers. Reference numerals 14 and 15 indicate output lines for the output of electric current. Reference numeral 2 indicates a stainless steel (SUS316L) vessel, an inner surface of which is lined with Teflon, into which are packed, in a honeycomb shape, 30 pipes having dimensions such that the inner diameter thereof is 1.3 mm, the thickness thereof is 80 micrometers, and the length thereof is 35 cm, and which comprise Pd (80)—Ag (10)—Au (10).

Reference numeral 3 indicates a constant temperature bath. Reference numeral 4 indicates a pump for circulating hydrogen fluoride solution among generator unit 1, vessel 2, constant temperature bath 3, and piping. Reference numeral 6 indicates a thermometer.

A hydrogen fluoride solution comprising anhydrous hydrogen fluoride (99.99% purity) to which approximately 1% of water was added was introduced into the system.

First, while circulating the hydrogen fluoride solution at a flow rate of 1 cc/sec, feedback of the output of thermometer 6 to the constant temperature bath was conducted, and the temperature of the hydrogen fluoride solution was maintained at 0° C.

In this state, output lines 14 and 15 were connected through the medium of a resistor, and when the difference in potential was measured, voltage of 0.8 V was obtained. Furthermore, a current of 1.4 A was obtained.

Figure 8:
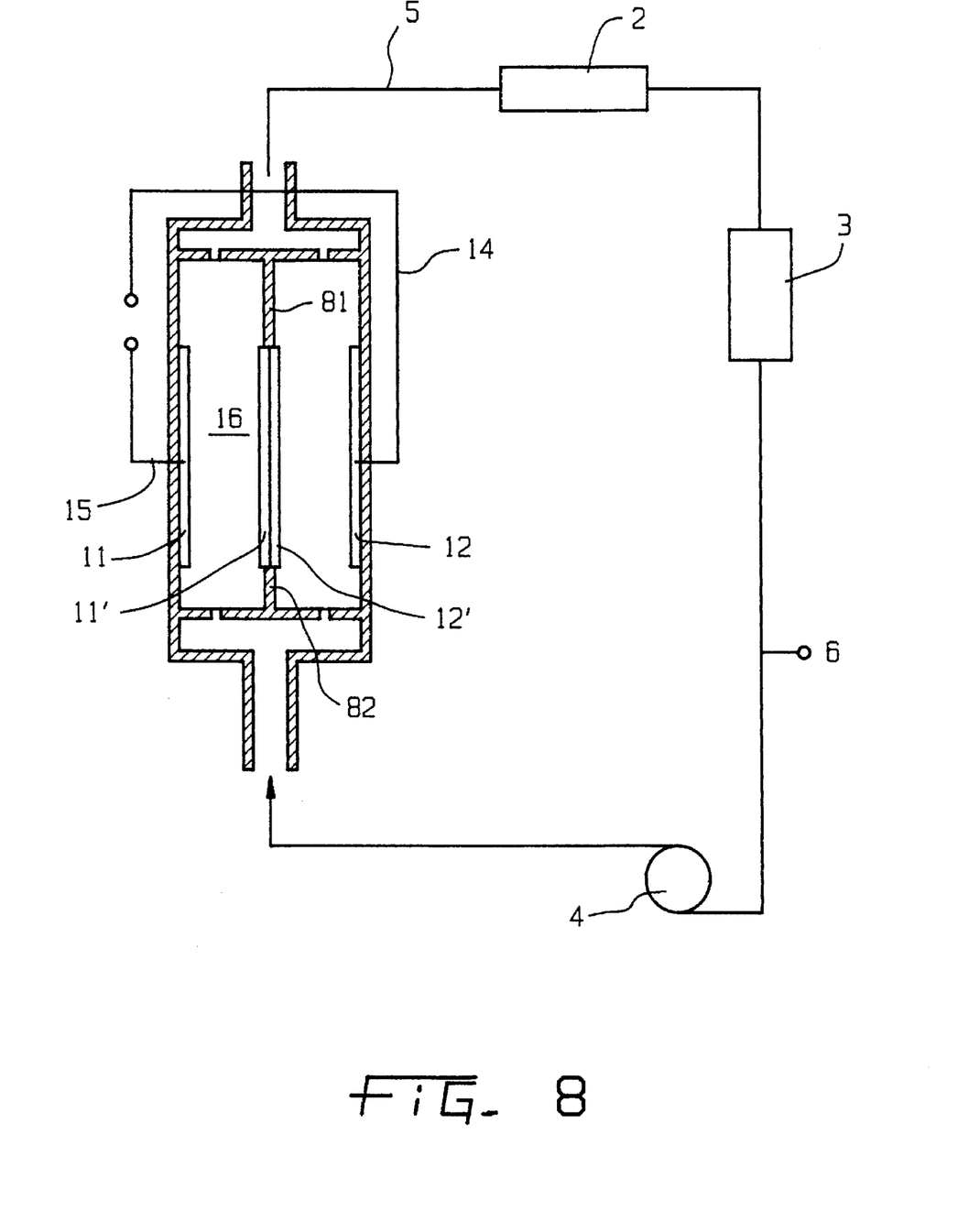
FIG. 8 shows a diagram of another power generator embodiment of the present invention.

Embodiment 2:

FIG. 8 shows a second embodiment of the present Invention.

The apparatus of the present embodiment is provided with 2 pairs of electrodes in the generator unit, and is designed to generate a large electromotive force.

In the diagram, reference numeral 11 indicates a $LaB_6$ electrode, reference numeral 12 indicates a Pt electrode, and reference numeral 16 indicates an electrode, the left side of which is Pt electrode 11', and the right side of which is LaB6 electrode 12'. Reference numerals 81 and 82 indicate insulating partitions which divide the cell; in the present embodiment, Teflon is used therefor. The other reference numerals indicate parts identical to those of FIG. 3.

The size of the electrodes is set at 15×10 cm, the distance between electrodes was set to 100 micrometers, and the length of partitions 81 and 82 were set to 5 cm and 15 cm, respectively.

In the same manner as in embodiment 1, a solution containing 1% of water in anhydrous hydrogen fluoride was introduced into the system, and this hydrogen fluoride solution containing a moisture component was circulated at a flow rate of 2 cm$^3$/sec. At this time, the interterminal voltage of output lines 14 and 15 was 1.6 V, and the current which was obtained was 1.4 A.

Industrial Applicable Field

By means of the present invention, it is possible to provide a power generator which is capable of producing a large amount of power at low cost using almost no fossil fuels and without polluting the environment.

That is to say, it is possible to obtain power generation producing an amount of power which is capable of replacing the power generators, such as thermal power generators, nuclear power generators, and the like, which are presently mainly employed, and furthermore, a power generator is provided which is capable of obtaining clean energy which does not cause environmental problems.

It is of course the case that the power generator of the present invention may be reduced or increased in size based on the number of electrodes, so that, for example, such a power generator could be provided in homes for single-home power generation easily and at low cost, and could also be used for automobiles and the like. Furthermore, such generators could be built into artificial satellites and could take the place of the solar cells which are presently used therein.

Furthermore, such a generator could also be used as a small-scale battery for use in flashlights or the like.

I claim:

1. A power generator, comprising:
   a power cell comprising a fluid storage means having an inner surface possessing corrosion resistive and electrically insulating properties with respect to hydrogen fluoride containing moisture, a solution comprising an admixture comprised of hydrogen fluoride fluid and water, said solution disposed in said fluid storage means in isolation from the atmosphere, an anode electrode comprised of a material possessing corrosion resistance with respect to hydrogen fluoride containing moisture and having a work function in the range of from about 1.95 to about 4.58 eV, and a cathode electrode comprised of a material possessing corrosion resistance with respect to hydrogen fluoride containing moisture and having a work function in the range of from about 5.04 to about 5.93 eV, said anode and cathode electrodes immersed in a state of mutual opposition in said solution; and
   a heat application means for applying heat to said solution.

2. A power generator in accordance with claim 1, wherein a concentration of said water is less than 2%.

3. A power generator in accordance with claim 1, wherein said fluid storage means comprises an input port and an output port, said input port and said output port connected by piping, said piping in fluid communication with a pressure feeding means for pressure feeding said solution into said fluid storage means, and a reaction vessel containing a catalyst for catalyzing the reaction of hydrogen and oxygen.

4. A power generator in accordance with claim 3, wherein said catalyst comprises one of palladium and a palladium alloy.

5. A power generator in accordance with claim 3, wherein said catalyst is in one of granular and powdered form, and fills the interior of said reaction vessel.

6. A power generator in accordance with claim 3, wherein said catalyst has the form of bundled thin tubes having a cross sectional honeycomb shape, and is retained within said reaction vessel.

7. A power generator in accordance with claim 1, wherein said anode electrode and said cathode electrode are attached to each other, and said attached electrodes are disposed in a multistaged form so that an anode electrode side and a cathode electrode side are in mutual opposition.

8. A power generator in accordance with claim 1, wherein said cathode electrode comprises one of Pt, Au, Ni, and Pd.

9. A power generator in accordance with claim 1, wherein said anode electrode comprises one of $LaB_6$, TiN, NbC, $W_2C$, ZrN, ZrC, and Cs.

10. A power generator in accordance with claim 1, wherein said cathode electrode comprises one of Pt, Au, Ni, and Pd coated on the surface of a metallic material.

11. A power generator in accordance with claim 1, wherein said anode electrode comprises one of $LaB_6$, TiN, NbC, $W_2C$, ZrN, ZrC, and Cs, coated on the surface of a metallic material.

12. A power generator in accordance with claim 1, wherein a distance between opposing electrodes is less than 1 cm.

13. A power generator in accordance with claim 12, wherein a distance between opposing electrodes is greater than 0.1 mm.

14. A power generator in accordance with claim 1, wherein said fluid storage means comprises a fluorine system resin.

15. A power generator in accordance with claim 1, wherein said fluid storage means comprises a fluorine system resin lining on the surface of a metallic material.

16. A power generator in accordance with claim 1, wherein said fluid storage means comprises a metallic material having formed on the surface thereof a fluoride passivating film having an approximately stoichiometric ratio.

17. A power generator in accordance with claim 1, wherein said fluid storage means comprises a material wherein a fluorine system resin is used as a liner on a metallic material having formed on the surface thereof a fluoride passivating film having an approximately stoichiometric ratio.

18. A power generator in accordance with claim 15, wherein said metallic material comprises one of pure steel and stainless steel.

19. A power generator, comprising:

a plurality of power cells, each said power cell comprising a fluid storage means having an inner surface having corrosion resistive and electrically insulating properties with respect to hydrogen fluoride containing moisture, and an input port and an output port, a solution comprising an admixture comprising hydrogen fluoride and water, said solution disposed within said fluid storage means in isolation from the atmosphere, an anode electrode comprising a material possessing corrosion resistance with respect to hydrogen fluoride containing moisture and having a work function in the range of from about 1.95 to about 4.58 eV, and a cathode electrode comprising a material possessing corrosion resistance with respect to hydrogen fluoride containing moisture and having a work function in the range of from about 5.04 to about 5.93 eV, said anode and cathode electrodes immersed in a mutually opposing manner in said solution;

a main input pipe which is connected to each said input port, a main output pipe which is connected to each said output port, said main input pipe and said main output pipe connected through a pressure feeding means for pressure feeding said solution to each said fluid storage means, and through a reaction vessel containing a catalyst for catalyzing the reaction between hydrogen and oxygen;

output lines provided at each respective said anode and cathode electrodes of each said power cell, said output lines connected in series; and a heat application means for applying heat to said solution.

20. A power generator in accordance with claim 19, wherein said anode electrodes and cathode electrodes are joined, and said joined electrodes are disposed in a multistaged form so that anode electrode sides and cathode electrode sides are in mutual opposition.

21. A power generator in accordance with claim 19, wherein output pipes are grounded at a central point of the plurality of said power cells.

* * * * *